Nov. 16, 1926.

J. L. McINERNEY 1,607,290

INSTRUMENT FOR FACILITATING SALES OF MERCHANDISE

Filed Oct. 10, 1925    2 Sheets-Sheet 1

Fig. 1.

Inventor
James L. McInerney
By Williams, Bradbury,
McCaleb & Hinkle
Attys.

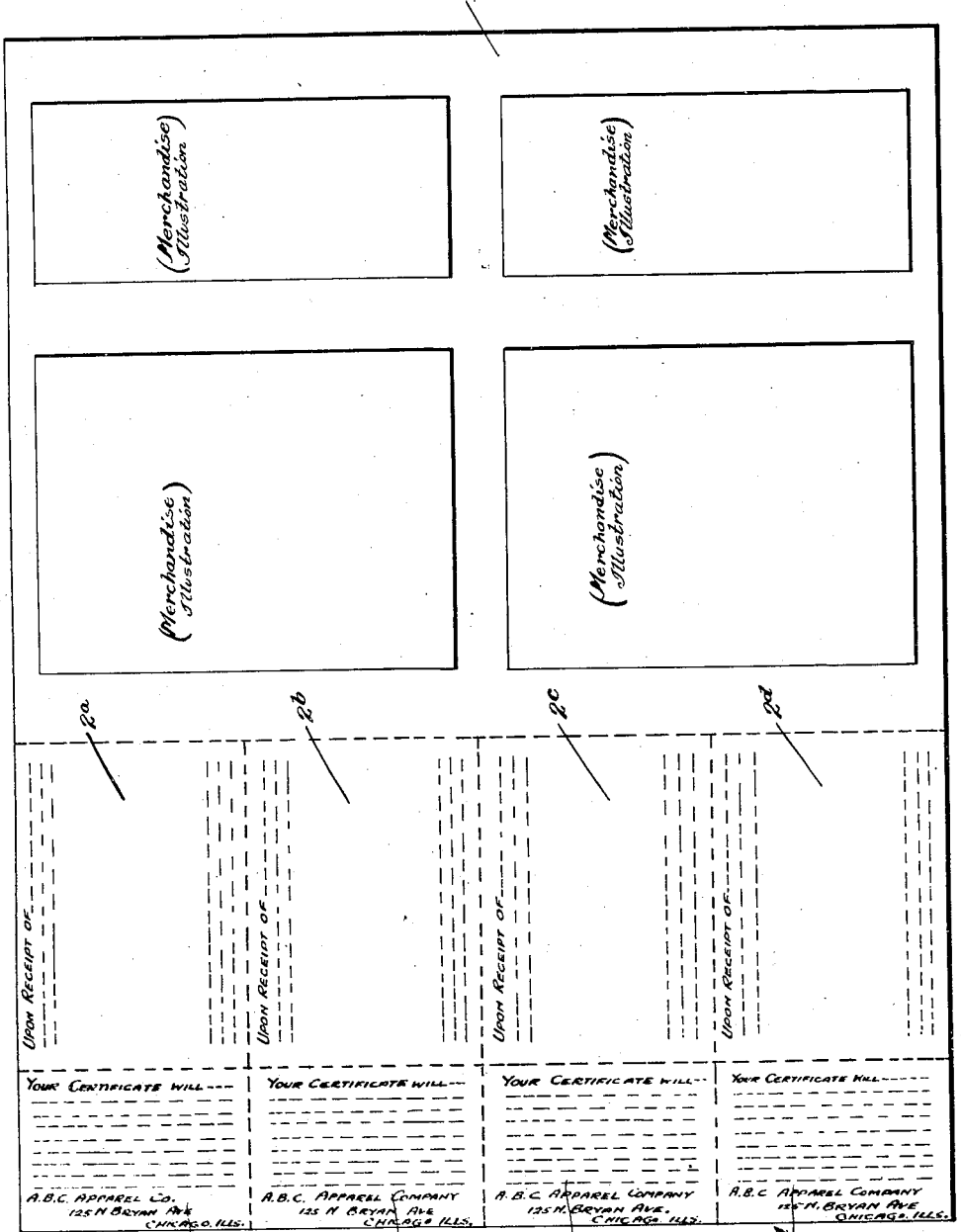

Patented Nov. 16, 1926.

1,607,290

UNITED STATES PATENT OFFICE.

JAMES L. McINERNEY, OF CHICAGO, ILLINOIS.

INSTRUMENT FOR FACILITATING SALES OF MERCHANDISE.

Application filed October 10, 1925. Serial No. 61,655.

My invention relates to an instrument for facilitating sales of merchandise and is particularly concerned with the provision of an instrument which may be distributed by a merchant in accordance with a plan set forth in the instrument and which, by its proper use, will enable each of an ever widening group of customers to secure certain selected merchandise, and by rendering selling service to the merchant, compensate the merchant for the difference between the reasonable selling price of such merchandise and a small cash payment made by the customer.

The instrument is designed in its several parts to facilitate the practical working of a novel merchandising plan and to protect and record the rights of every party involved in the transactions which it is the purpose of the instrument to encourage and promote. The invention consists in the novel combination, arrangement and characteristics of the several parts of the instrument and the indicia carried thereby.

In the accompanying drawings:

Figure 1 is an obverse view of the instrument and

Figure 2 is a reverse view thereof.

In the drawing, certain of the printed indicia (fully set forth in the following description) is represented by broken lines.

As illustrated in the drawings, the instrument comprises a certificate 1, a plurality of detachable coupons $2^a$, $2^b$, $2^c$, $2^d$, and a plurality of detachable receipts $3^a$, $3^b$, $3^c$, $3^d$. As distributed by the merchant the several parts of the instrument constitute a single paper sheet which readily may be divided into its several parts by virtue of perforating or scarring the sheet along the separating lines 4—4.

Assuming that "A. B. C. Apparel Company" is a merchant distributing merchandise in accordance with the selling plan set forth in the instrument of my invention, and that "Mary Jones" is a customer participating in such selling plan, characteristic indicia for the obverse face of the certificate 1 will be substantially as follows:

"A. B. C. Apparel Company
    Chicago, Ill.
        Certificate No. 101.

"This certificate is issued by the A. B. C. Apparel Company, hereinafter referred to as the Company, to
    "Mary Jones"
hereinafter referred to as the customer, upon payment to the company of one dollar ($1.00), receipt whereof is hereby acknowledged, which sum shall apply as a part payment on the purchase price of one (1) lot of merchandise to be chosen from those described on the reverse side hereof, at the agreed price and fair and reasonable value of five dollars ($5.00) which the company hereby agrees to deliver to the customer, fully warranted, upon receipt at its Chicago office of the balance of the purchase price of four dollars ($4.00) at any time within six (6) months from the date appearing at the bottom of this certificate.

"The company having abiding confidence in the quality and value of its merchandise described on the reverse side of this certificate, and in the interest of promoting its sales to the ultimate user through the medium of its satisfied and contented customers in whom it has the greatest confidence, offers to the customer named in this certificate the following opportunity of which he may take advantage in lieu of paying the balance of the purchase price of four dollars ($4.00) for any lot of merchandise described on the reverse side hereof.

"The customer may sell four (4) lots of merchandise to four (4) different purchasers under the same terms and conditions as are herein contained, in the following prescribed manner:

"The customer shall upon receipt of one dollar ($1.00) for each of the four coupons hereto attached, fill in, in ink or indelible pencil, the name and address of the respective purchaser, and shall issue to said purchaser the receipt attached to such coupon, which receipt the purchaser shall retain as evidence of his payment of one dollar ($1.00) which is to apply on his purchase of five dollars ($5.00) worth of merchandise described on the reverse side hereof. The customer shall immediately forward the four dollars ($4.00) together with the four coupons to the company at Chicago and upon receipt thereof the company will promptly mail to each coupon purchaser a certificate in all respects identical with this one together with four (4) coupons and four (4) receipts attached.

"Upon receipt by the company at Chicago of the four (4) coupons properly filled in, together with the four dollars ($4.00) the company will deliver without further charge to the customer named herein, the lot of merchandise selected.

"Remittances should be made by post-office or express money order or check. If remittance is made in currency it must be sent by registered mail.

"The customer is not in any way obliged to secure other customers in order to participate in this unusual merchandising plan. The customer may on receipt of the certificate return the same to the company at Chicago intact, together with four dollars ($4.00) the balance of the stipulated purchase price and the company will promptly deliver any one selection of merchandise described on the reverse side hereof.

"Or as further alternatives the customer may secure the merchandise in any one of the following manners:

"If, in the manner prescribed in this certificate but one coupon is sold to a purchaser, the customer may forward the one dollar, and the coupon properly executed to the company at Chicago, together with the certificate with the remaining coupons and receipts attached, and three dollars ($3.00) in cash and the company will forward any one selection of the merchandise described; if two coupons are sold, then the customer shall send the company the two coupons thus sold and the two dollars ($2.00) received in payment, and also forward the certificate and the two unused coupons and receipts together with two dollars ($2.00) additional and the company will forward any one selection of the described merchandise; if three coupons are sold the customer shall remit the three coupons together with the three dollars ($3.00) received in payment, and also enclose the certificate and the unused coupon and receipt and in addition one dollar ($1.00) and the company will forward any one selection of the described merchandise.

"If, however, a customer after having received a certificate from the company in the manner herein provided, does not desire to take advantage of this unusual offer, the following terms and conditions shall apply: If one coupon has been sold to a purchaser and the coupon and the money forwarded to the company, the company hereby guarantees that upon surrender by the customer of the certificate and the three remaining coupons and receipts it will promptly refund to the customer the one dollar ($1.00) paid by he or she for the certificate, and will in addition issue to the customer a credit voucher for one dollar ($1.00) which may be applied on any purchase from the company within a period of six months; the issuance of such credit voucher is contingent however upon the fact that prior to its issuance the person to whom the customer sold the one coupon has not cancelled his or her contract; if having sold two coupons, the same procedure will be followed excepting only that the credit voucher to be issued under the prescribed limitations shall be of the value of two dollars ($2.00); if three coupons have been sold the same procedure will be followed excepting only that the credit voucher to be issued under the prescribed limitations shall be of the value of three dollars ($3.00). In the two latter instances the value of the credit voucher issued shall be reduced proportionately to the number of purchasers of coupons who shall have cancelled their contracts prior to the customer's application for refund. Credit vouchers are redeemable in merchandise only.

"If any purchaser of a coupon shall desire to cancel his or her purchase and secure a refund of the one dollar ($1.00) paid he or she shall immediately notify the company to this effect giving the serial number of his or her receipt; the company shall in turn advise the customer who made the sale and upon the customer having sold a similar coupon to another purchaser and forwarding the same together with the purchase price of one dollar ($1.00) to the company, such first purchaser shall be forwarded the refund desired.

"The A. B. C. Apparel Company carefully inspects all of its merchandise and absolutely guarantees to replace any that might prove defective or fails to give full and complete satisfaction.

"The customer hereby agrees upon notice by the company of any cancellation in a sale of a coupon, to immediately re-sell the same. It is understood and agreed that a sale shall not be considered completed until the sum of four dollars ($4.00) for each four (4) coupons properly filled in, or used under the conditions outlined herein, has been received by the company at its office in Chicago.

"The A. B. C. Apparel Company reserves the right to confine its sales to the United States of America and its possessions.

"The A. B. C. Apparel Company wants every customer and purchaser to fully and completely understand the terms and conditions of this agreement. For that purpose the customer receives herewith four true copies of the terms and conditions of this certificate one of which he agrees to deliver to each purchaser.

"A. B. C. APPAREL COMPANY,
By RICHARD ROE.
Date Sept. 29, 1925.

Note: In all communications with the company specify the number of your certificate, coupon or receipt, which will be found in the upper right hand corner."

On its reverse face the certificate will bear illustrations of merchandise (as for instance in the fields 5—5) which any customer may acquire in accordance with the terms and conditions set forth on the obverse face of the certificate.

Each of the coupons $2^a$, $2^b$, $2^c$, and $2^d$, carries on its obverse face indicia like that illustrated in Figure 1 of the drawings. It will be noted that the indicia carried by each of the coupons bears a space for the name (preferably the signature) of a party to whom the adjacent receipt may be issued and also lines for the post office address of such party. As set forth in the certificate, each of the coupons is to be returned to the merchant by the customer in order that the merchant may have the name and address of the party to which the corresponding receipt is issued and also in order that the merchant may have positive and unmistakable evidence that the receipt holder fully understands the terms and conditions under which his or her receipt was acquired.

To the end that each coupon when returned to the merchant may constitute positive evidence that the holder of the corresponding receipt fully understands the rights and privileges represented by that receipt, each coupon bears upon its reverse face suitable indicia reading substantially as follows:

"Upon receipt of this coupon properly filled in by the A. B. C. Apparel Company, Chicago, the account of the person whose name appears on the reverse side hereof shall be credited with one dollar ($1.00) to be applied on his or her purchase of merchandise in accordance with the sales contract of the A. B. C. Apparel Company.

"In order that the person whose name appears on the reverse side hereof may benefit by the terms of this agreement, the A. B. C. Apparel Company agrees to promptly mail to the said person a certificate in all respects identical to the one to which this coupon was attached, together with four (4) coupons in all respects identical to this one, and with the four (4) receipts attached thereto.

"The person whose name appears on the reverse side hereof acknowledges that he or she has received a true copy of said contract, and that he or she knows and agrees to the terms and conditions thereof."

At this point I will say that it is very desirable that each coupon and receipt be marked so as to be readily identified after separation from the certificate to which it was originally attached and that each receipt be so marked as to be readily identified with its corresponding coupon. To this end each coupon and each receipt bears the number of the associated certificate and in addition, each coupon and its corresponding receipt bears an index letter,—all as is clearly illustrated in the drawings.

Each of the receipts forming part of the instrument bears on its obverse face indicia reading substantially as follows:

"A. B. C. Apparel Company
Chicago, Illinois.

"The holder of certificate No. 101 has received one dollar ($1.00) from the person whose name appears on the coupon, to which the receipt was attached, as part payment of the purchase price of one selection of merchandise which is described on the reverse side of said certificate. Upon receipt of the said coupon properly filled in, by the A. B. C. Apparel Company, the person whose name appears on said coupon will have credited to his or her account, the sum of one dollar ($1.00), to be applied on his or her purchase of merchandise in accordance with the sales contract of the A. B. C. Apparel Company. The person whose name appears on the said coupon acknowledges that he or she has received a true copy of said contract, and that he or she knows and agrees to the terms and conditions thereof.

Receipt No. 101 A".

Each receipt furthermore desirably bears on its reverse face explanatory indicia reading substantially as follows:

"Your certificate will be sent to you as soon as we receive your coupon and the $1.00 which you paid. If you should not receive it in ten days, please notify us and state the number which appears hereon.

A. B. C. APPAREL CO.
Chicago, Ill."

It may be assumed that the customer "Mary Jones" has paid the merchant "A. B. C. Apparel Company" the sum of one dollar ($1.00) in exchange for the instrument represented in the accompanying drawings, and as a deposit for $5.00 worth of merchandise selected from the illustrations on the reverse face of the certificate 1. The customer "Mary Jones" is now in a position to acquire her selected merchandise, without any further out-of-pocket disbursement on her part, by rendering selling service to the "A. B. C. Apparel Company", i. e. by persuading four additional customers to do business with the "A. B. C. Apparel Company" under the same terms and conditions as are applicable to "Mary Jones".

"Mary Jones" upon securing each additional customer for the "A. B. C. Apparel Company" issued such new customer one of the detachable receipts ($3^a$, $3^b$, $3^c$, $3^d$) and also causes the name and address of such new customer to be written in the proper spaces on the obverse face of the coupon corresponding with that receipt. The name of the new customer as it appears upon the coupon is preferably the signature of such customer in order that the coupon when mailed in to the "A. B. C. Apparel Company" will not only record the name and address of such new customer, but will also constitute positive evidence that such new customer thoroughly understands the terms and conditions under which his or her receipt and the rights represented thereby were acquired.

After securing four additional customers, and after having issued the several receipts, and after having caused the several coupons to be properly filled out as hereinbefore mentioned, "Mary Jones" delivers the several coupons, together with the four dollars ($4.00) received from the four new customers whose names appear upon the coupons to the "A. B. C. Apparel Company". The "A. B. C. Apparel Company" thereupon is in a position to deliver to "Mary Jones" the merchandise which she has selected and for which she has paid partly in cash and partly by selling effort. Since the several coupons returned to the "A. B. C. Apparel Company" identify the several new customers secured by "Mary Jones", the "A. B. C. Apparel Company" is now in a position to send each of such new customers an instrument of the kind furnished to "Mary Jones" in the first instance, whereupon each of such additional customers, having made a one dollar ($1.00) deposit (to "Mary Jones") on selected merchandise, may proceed to render services in payment of the balance due on such selected merchandise by securing additional customers in exactly the same manner as did "Mary Jones".

Since the invention herein claimed relates to the instrument shown and not to a method of doing business, I shall not prolong this specification by a detailed discussion of the advantages of the herein described method of selling, either from the standpoint of the merchant or of the customer.

What I claim as new and desire to secure by Letters Patent of the United States is:

An instrument of the class described comprising a sheet including a certificate, a plurality of detachable coupons, and detachable receipts to the number of the coupons aforesaid, each of said certificates bearing indicia stipulating that the holder thereof may secure certain merchandise by issuance of said receipts for cash to new customers and by delivering such cash to the maker of the certificate together with said coupons bearing the names and addresses of the parties to whom the receipts are issued, each of said coupons bearing appropriately designated spaces for the name and address of a receipt holder and bearing indicia stipulating that the receipt holder whose name appears on such coupon understands the rights represented by his or her receipt, each of said receipts bearing indicia stipulating that, upon the completion of the transaction by the certificate holder and the maker thereof, the holder of such receipt will receive an instrument like the one herein described, subject to the conditions applicable to the holder of the certificate herein described.

In witness whereof, I hereunto subscribe my name this 5th day of October, 1925.

JAMES L. McINERNEY.